S. T. SANFORD.

Vegetable Cutter.

No. 28,412.

Patented May 22, 1860.

WITNESSES

INVENTOR

UNITED STATES PATENT OFFICE.

SAMUEL T. SANFORD, OF FALL RIVER, MASSACHUSETTS.

VEGETABLE-SLICER.

Specification of Letters Patent No. 28,412, dated May 22, 1860.

*To all whom it may concern:*

Be it known that I, SAMUEL T. SANFORD, of Fall River, in the county of Bristol and State of Massachusetts, have invented a new and Improved Device for Slicing Vegetables; and I do hereby declare that the following is a full, clear, and exact description of the same, reference being had to the annexed drawings, making a part of this specification, in which—

Figure 1:
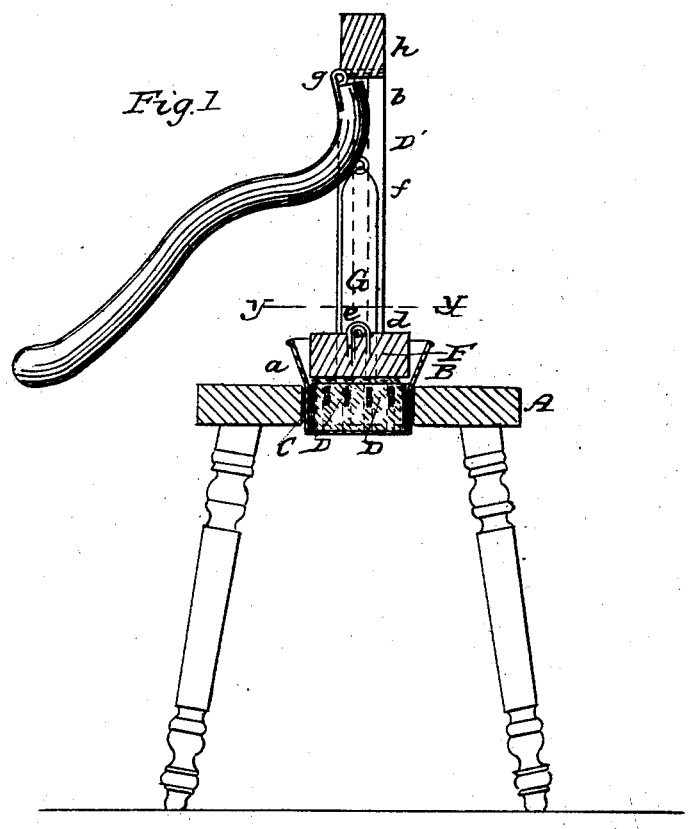
Figure 2:
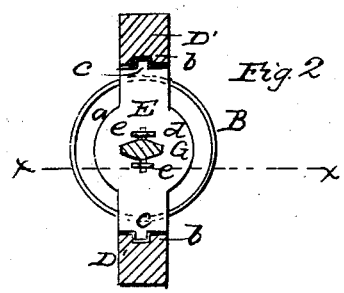

Figure 1, is a vertical section of my invention, taken in the line $x$ $x$, Fig. 2. Fig. 2 a horizontal section of the same, taken in the line $x$, $x$, Fig. 1.

Similar letters of reference indicate corresponding parts in the two figures.

To enable those skilled in the art to fully understand and construct my invention, I will proceed to describe it.

A, represents a bench or platform in the center of which a box or hopper B, is fitted in a proper sized opening, the box or hopper being retained in its place by a flaring or bell-shaped top $a$, as shown clearly in Fig. 1. Within the box or hopper B, a rim or circular frame C, is placed or fitted, said rim or frame having a series of knives or cutters D, secured in its upper end. These knives or cutters are placed horizontally in the frame C, and they may be parallel with each other—that, probably would be the preferable position. The upper edges of the knives or cutters are the cutting edges, and any suitable number of knives may be used, according to the size of the box or hopper B, and the desired size of the slices into which the vegetables are to be cut.

On the bench or platform A, there are secured two uprights D', D', the inner sides of which are grooved vertically as shown at $b$, to receive tenons $c$, at the ends of a cross bar E, which has a cylindrical follower or plunger F attached to its under side, said follower or plunger being equal in diameter to the cutter frame C.

G is a rod, the lower end of which has a pin $d$, passing transversely through it, the ends of the pin passing through eyes or staples $e$, $e$, in the top of the cross-bar E. The upper end of the rod G is connected by a joint $f$, with a lever H, the upper end of which is attached by a hinge or joint $g$, to a traverse bar $h$, which connects the upper ends of the uprights D', D'. The connection of the rod G, to the lever H, is just below the hinge or joint $g$, as shown clearly in Fig. 1.

The operation is as follows:

The vegetables to be cut or sliced are placed in the box or hopper B, and upon the knives or cutters D, the follower or plunger F being raised above the box or hopper B. The lever H, is then forced or pressed down, and the follower or plunger F drives the vegetables down between the knives or cutters, the latter slicing the vegetables into pieces corresponding in thickness to the spaces between them.

The operation of the rod G and lever H, is similar to a toggle the rods G, being connected by joints to both the follower or plunger and the lever H. By this means the follower or plunger may be operated with but a moderate application of power, and the desired work expeditiously and properly performed.

Having thus described my invention I claim and desire to secure by Letters Patent, as an improved article of manufacture—

A vegetable cutter composed of a table A, hopper B, knives D, uprights D', D', follower F, toggle rod G, lever H, when arranged and constructed as herein shown and described.

SAMUEL T. SANFORD.

Witnesses:
JOHN LINDSEY,
L. LINDSEY.